June 27, 1961  S. A. SCHERBATSKOY  2,990,474
RADIATION DETECTOR
Filed Jan. 25, 1954  4 Sheets-Sheet 1

INVENTOR.
Serge A. Scherbatskoy

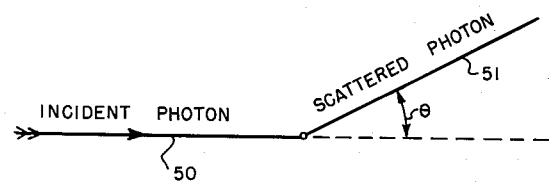
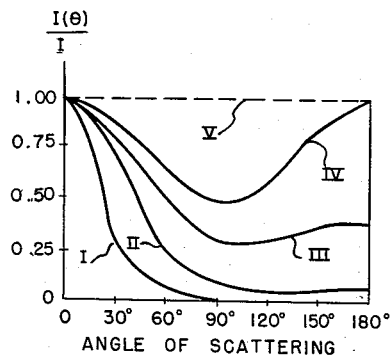
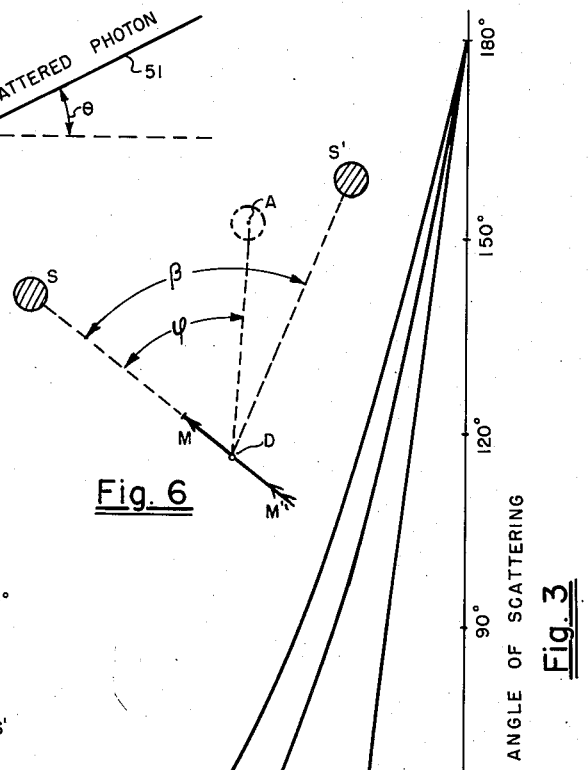
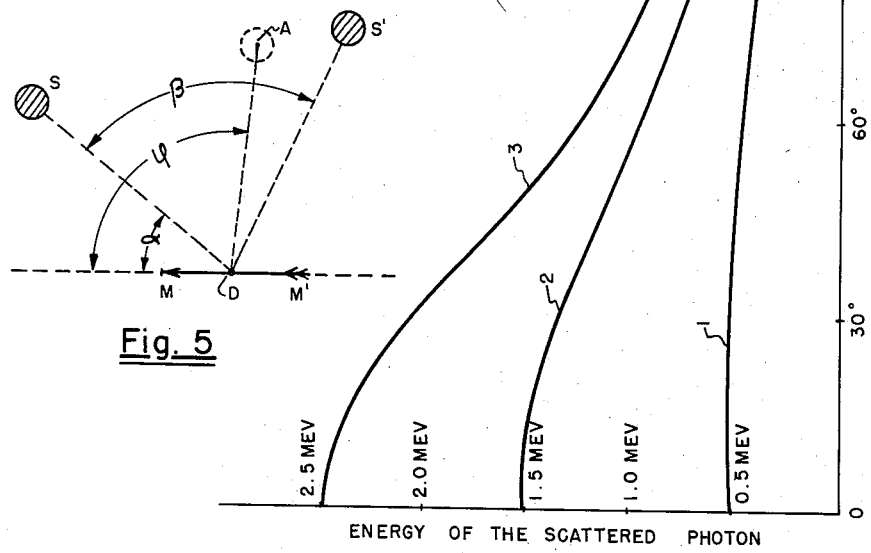

… …

United States Patent Office 2,990,474
Patented June 27, 1961

2,990,474
RADIATION DETECTOR
Serge A. Scherbatskoy, 804 Wright Bldg., Tulsa 3, Okla.
Filed Jan. 25, 1954, Ser. No. 406,027
9 Claims. (Cl. 250—83.3)

This appplication is a continuation-in-part of the U.S. patent application Serial No. 399,972, now Patent No. 2,939,010, filed on December 23, 1953, by Serge A. Scherbatskoy.

This invention is concerned with a radiation detector and method and apparatus for performing measurements in a bore hole of radiations resulting from nuclear transformations within the formations adjoining said hole, said nuclear transformations being either spontaneous and caused by natural radioactivity or induced and caused by an external agent such as a source of neutrons placed adjacent to said formations in the neighborhood of the detecting instrument.

Many measurements have been made of the above radiations and particularly gamma radiations. These gamma radiations usually result from natural radioactive substances present in the formations or from the effect of irradiation of the formations with a stream of neutrons. The measurement of these radiations has been found useful in geophysical prospecting and in many instances the measurement of the radiations obtained from a geological formation has yielded valuable information as to the nature of the formation. Thus to cite an example, a radiation detector either alone or accompanied by a source of neutrons has been lowered into a bore hole in the earth and measurements were made at various levels of gamma rays derived from the formations.

In the above arrangements the radiation detector was exposed to radiations arriving from all the directions within the bore hole. Therefore the amount of radiation detected was indicative of the nature of the formation located not only at the level of the instrument, but also above and below said level. It is desirable, therefore, to have more specific information about the radiation obtained from the particular formation located at the level of the detector and to eliminate the extraneous effects caused by the formations located above and below said particular formation.

This invention is, therefore, concerned with a method and apparatus for selectively receiving and measuring only those radiations that arrive laterally from the formations located at the same level as the detector. These measurements when correlated with the measurements of the depth at which they were taken have shown accurately the interfaces between the various strata and have given good indication of particular strata.

It is an object of the present invention to provide an improved method and improved apparatus for determining the character of unknown substances adjacent a bore hole.

It is another object of the present invention to provide an improved method and improved apparatus for selectively receiving those gamma radiations that arrive laterally from the adjoining formations at various depths within the drill hole.

For further details of specific devices embodying the principles of this invention and for a more complete understanding of the mode of application of the principles of this invention and the numerous advantages thereof, reference may be had to the accompanying drawings in which:

FIG. 2 illustrates certain angular relationship occurring during Compton scattering.

FIG. 3 shows energies of a scattered photon for various angles of scattering.

FIG. 4 shows angular intensity distribution of the scattered photons.

FIG. 5 shows a geometrical relationship between the direction of the detector axis and the direction of various sources in the surroundings.

FIG. 6 shows another geometrical relationship between the direction of the detector axis and the direction of various sources in the surroundings.

Figure 1A:
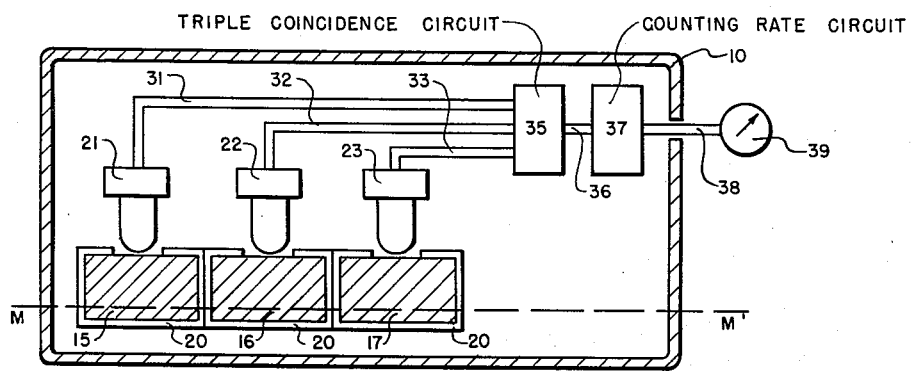
FIG. 1A shows a directional detector comprising three adjacent detecting elements aligned along a reference axis.

Referring now to FIG. 1A the directional gamma ray detector shown therein is enclosed within a suitable container 10 and comprises as its essential elements three crystals 15, 16, 17 made of naphthalene, anthracene, sodium iodide, or any other suitable substance adapted to "scintillate," i.e. to produce a flash of light due to the excitation and ionization produced by the passage of a charged particle. The crystals 15, 16, 17 are aligned along a direction M—M¹ which we shall designate as "the axis of the directional detector" and each of these crystals has its outside surface covered with an aluminum reflector 20. The light flashes produced in the crystal 15 are adapted to be transmitted by means of the reflector 20 to a photomultiplier provided with a voltage supply, the combined photomultiplier and voltage supply being designated as 21. Similarly, the light flashes produced in the crystals 16 and 17 are adapted to be transmitted by means of the reflectors 20 to photomultipliers 22 and 23, respectively. Each of the photomultipliers is adapted to produce across its output terminals a current pulse in response to a flash of light in the corresponding crystal.

The outputs of the photomultipliers 21, 22, 23 are applied by means of leads 31, 32, 33, respectively, to a triple coincidence circuit 35. The coincidence circuit is adapted to produce across its output leads 36 an electric pulse whenever the pulses produced in the outputs of the photomultipliers 21, 22, and 23 occur in coincidence. Coincidence circuits are well known in the art and for their description see, for instance, E. Segre "Experimental Nuclear Physics," John Wiley & Sons, New York, N.Y., 1953, pp. 104–108.

The output leads of the coincidence circuit 35 are applied to a counting rate circuit 37. The counting rate circuit is of a standard construction and is adapted to produce across its output terminals 38 a D.C. voltage, the magnitude of which represents the frequency of impulses produced in the output leads of the coincidence circuit 35. The leads 38 are in turn connected to an indicator 39 indicating said output voltage.

Figure 1B:
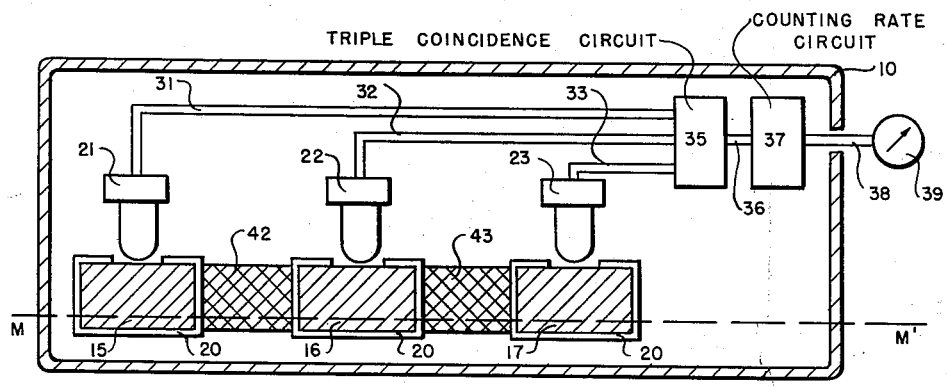
FIG. 1B shows a directional detector comprising three detecting elements aligned along a reference axis, said elements being separated one from the other by means of tungsten shields.

FIG. 1B shows a modification of the arrangement of FIG. 1A in which the elements common to both figures are designated by the same numerals. It is noted that in FIG. 1B the crystals 15 and 16 are separated one from the other by a tungsten shield element 42 and the crystals 16 and 17 are separated by a tungsten shield element 43.

Figure 1C:
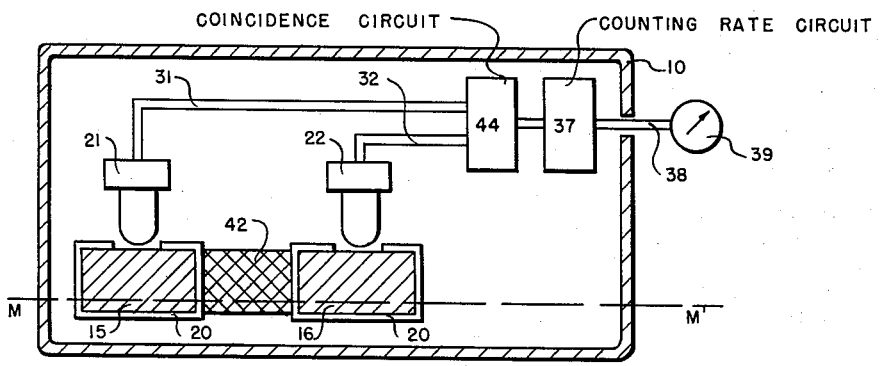
FIG. 1C shows a directional detector comprising two detecting elements aligned along a reference axis.

FIG. 1C shows a modification of the arrangement of FIG. 1B that comprises only two crystals 15, 16 separated by the tungsten shield 42. The corresponding photomultipliers 21, 22 have their outputs connected to a double coincidence circuit 44. The output of the coincidence circuit 44 is connected to the counting rate circuit 37 and the output of said latter circuit is indicated on a meter 39.

We shall consider now the interaction of the incoming gamma radiation with crystals such as 15, 16, and 17. It is well known that gamma rays interact with the matter in three different ways: by photoelectric effect, Compton effect, and pair formation. We shall consider here the first two types of interaction.

In the photoelectric effect which is characteristic of low energy photons, the incoming photon ejects an orbital electron from the atom of the crystal. The photon disappears in this process and the electron slows down in the crystal, producing a pulse of light which in turn produces a current impulse in the output of the photomultiplier. Since the photon has entirely disappeared in the crystal, no further effects are produced in any of the adjoining crystals shown in FIGS. 1A, 1B, and 1C. Consequently, a photoelectric absorption is characterized by an occurrence of a pulse in one of the photomultipliers while the adjoining photomultipliers produce no pulses. Consequently, the photoelectric effect is not recorded, neither by the triple coincidence circuit 35 of FIGS. 1A and 1B, nor by the double coincidence circuit 44 of FIG. 1C.

In the Compton effect the incoming photon is scattered by one of the electrons in the crystal. As a result of such scattering, the electron has acquired kinetic energy, thus producing a pulse of light in the crystal, said light producing in turn a current impulse in the output of the photomultiplier associated with said crystal. The scattered photon usually escapes from the crystal and sometimes interacts with adjoining crystals, thus producing one or two coincident light pulses in said adjoining crystals. We shall investigate now when such an additional interaction does take or does not take place.

It is well known that as a result of Compton scattering the incoming gamma ray is usually deflected from its original course as a result of a collision with an electron. Such a deflection is shown in FIG. 2 in which 50 designates the photon trajectory before the collision, 51 designates its trajectory after the collision and $\theta$ is the angle of scattering which shows the deviation of the direction of the scattered photon from the direction of the incoming photon. The energy of the scattered photon is smaller than the energy of the incoming photon and depends upon the angle of scattering $\theta$, i.e. the larger is the scattering angle, the smaller is the energy of the scattered photon. This relationship is shown diagrammatically in FIG. 3, in which curve 1 corresponds to an incident photon energy of 0.5 mev. and curves 2 and 3 correspond to incident photon energies of 1.5 mev. and 2.5 mev., respectively. The abscissas represent the angles of the scattered photons and the ordinates are the energies of the corresponding scattered photon. It is seen that if the incident photon has relatively low energy (curve 1) the energy of the scattered photon decreases very slowly when the angle of scattering is increased. However, for incident photons of a relatively high energy such as 2.5 mev. (curve 3) the energy of the scattered photon decreases rapidly when the angle of scattering is increased.

FIG. 3 does not describe fully Compton scattering since it shows merely how the energy of each individually scattered photon depends upon the angle of scattering and does not show the number of photons scattered into various angles. We need, therefore, an additional diagram such as shown in FIG. 4 showing the angular distribution of the intensity (i.e. number) of scattered photons. Curve I shows the angular distribution of the intensity of scattered photons when the initial photon energy is 2.5 mev. Curves II and III show corresponding distribution for the initial photon energies of 0.5 mev. and 0.08 mev., respectively, and curve IV corresponds to very soft gamma rays. The abscissas represent the angle of scattering $\theta$; $I_0$ is the total incident flux and $I(\theta)d\Omega$ is the portion of flux that was scattered at an angle $\theta$ and is comprised within an elementary solid angle $d\Omega$. Consequently, the ordinates corresponding to the value $I(\theta)/I_0$ represent the distribution in intensity of the scattered flux for various values of $\theta$. For further reference to this distribution see Heitler's "The Quantum Theory of Radiation," second edition, Oxford University Press, pp. 146–160 and particularly FIG. 12, page 156.

When considering the angular distribution of scattered photons, we differentiate between "isotropic scattering" and "anisotropic scattering." In isotropic scattering, the intensity of the scattered radiation would be uniformly distributed in all directions and such a distribution would be represented by a horizontal line V. It is apparent from the curves I, II, and III, of FIG. 4, that the distribution of the scattered photons is not isotropic and tends to be concentrated at small values of the angle of scattering $\theta$. Thus the photons are scattered in the forward direction and thus tendency for scattering forward becomes much more pronounced for incident photons of high energy. Thus curve IV showing the distribution for incoming photons of relatively small energy is not very different from the isotropic distribution represented by the curve V. We see, however, that for an incident photon energy of 0.5 mev. (curve II), the scattering distribution is concentrated in the region of small values of $\theta$ (forward direction) and it becomes much more concentrated in the forward direction for incident photons of higher energies as shown by means of curve I (for 2.5 mev.).

We shall utilize the above properties of Compton scattering to provide a radiation detector having the following two characteristics: (a) direction selectivity, and (b) energy selectivity. Because of its directional selectivity, the detector is adapted to respond primarily to radiations arriving from a predetermined direction and thus it can be used to determine the direction of an unknown source and for triangulation purposes to determine the position of an unknown source. Because of its energy selectivity, the detector is adapted to respond primarily to photons of large energy and is not responsive to soft photons. It is well known that the photons of low energy that arrive at the detector originate at the small distances in the immediate neighborhood of the detector while the photons of large energy that arrive at the detector have a considerably greater penetrating power and originate within large distances from the detector. Thus because of its energy selectivity, the detector will be selectively responsive to radiation sources that may be located at considerable distances from the detector.

Consider now FIG. 3 showing the detector of the type illustrated in FIG. 1A positioned in the neighborhood of the point D, and having its axis aligned along the direction MM¹. Assume that the detector is submerged in a medium containing a distributed source of soft gamma rays and that at a relatively large distance from the detector is located an unknown source S radiating gamma rays of relatively high energy. Let $\alpha$ designate the angle between the direction of the source S and the axis MM¹ of the detector. We shall show how the response of the detector will vary with the orientation of its axis, i.e. with the angle $\alpha$. Assume also that another unknown source S¹ identical to the source S is located at a large distance from the detector and let $\beta$ be the angle between the direction DS and DS¹.

Assume that the axis of the detector MM¹ is oriented in the direction of the source S as shown in FIG. 6. Then the gamma rays radiated by the source S arrive at the detector and interact with the crystal 15. Since the energy of the gamma rays is relatively high, we have here the case of Compton scattering illustrated by curve I of FIG. 4, according to which the scattered photons are concentrated in the forward direction. We may thus assume all the scattered photons went into the crystal 16 and a great portion of them undergoes a second scattering in the crystal 16. By referring now to curve 3 of FIG. 3, we see that the photons that have been scattered by the crystal 15 have a relatively high energy (since $\theta$ is small). Consequently these photons undergo again a forward scattering into the crystal 17 and a great portion of these photons interact with the crystal 17, said last interaction being of the type of Compton scattering or photoelectric effect. It is well known that each interaction of a photon with a crystal knocks out an electron which in turn produces a flash of light in a manner well known in the art and causes an electric impulse to appear in the output of the corresponding photomultiplier. In this particular case a gamma ray arriving from the detector from the source S causes three successive interactions in the crystals 15, 16, 17. These are almost simultaneous and therefore three impulses appear in the outputs of the photomultipliers 21, 22, and 23. These impulses arrive in coincidence and therefore actuate the coincidence circuit 35. Thus a gamma ray arriving from the source S actuates the coincidence circuit and causes an impulse to appear across the output leads 36.

Consider now a photon radiated by the source $S^1$. This photon may interact with either of the crystals 15, 16, and 17. Since the incident photon has a high energy, we know from curve I of FIG. 4 that the scattered photon is projected forward in the same direction as the incident photon, i.e. in the direction $S^1D$. Such a scattered photon produced in either of the crystals 15, 16, 17 escapes and does not interact with any of the adjoining crystals. In such case, we obtain a single light pulse in the crystal in which the interaction took place and a current impulse in the corresponding photomultiplier. Since there are no coincident impulses in the outputs of the adjoining photomultipliers, the coincidence circuit 35 remains inactive. Thus a gamma ray arriving from the source $S^1$ does not actuate the coincidence network and causes no impulse across the output leads 36.

Consider now the effect of the source that is continuously distributed throughout the medium surrounding the detector. Let the density of the distribution be such that the amount of the radioactive substance contained in $cm^3$ of the medium is small compared to the amount of the substance contained either in the source S or $S^1$, but let the total amount of the radioactive substance uniformly distributed in said medium be considerably larger than the corresponding amounts contained in the sources S or $S^1$. Assume also that the substance continuously distributed in said medium emits hard and soft gamma radiation.

Thus in addition to gamma rays emitted by the sources S and $S^1$ the detector receives from all directions soft and hard gamma rays radiated by the continuously distributed sources. It is apparent that a soft gamma ray interacts only with one of the crystals due to photoelectric effect, and for the reasons explained above no coincidence pulses are produced. Therefore, the detector is insensitive to soft radiations.

Consider the hard radiations emitted from all directions by the surrounding medium. We shall determine first the effect of gamma rays radiated from a small volume of the medium enclosed in a small sphere surrounding the point A. The point A may be located anywhere in the space surrounding the detector. The gamma rays radiated by such a small sphere arrive at the detector at an angle $\varphi$ and said angle $\varphi$ may have any value from 0° to 180°, depending upon the position of the point A. Consider now the effects of the scattering of these gamma rays by the crystal 15. Since the incident gamma rays have relatively large energies, the scattering is predominantly forward in accordance with curve I of FIG. 4. However, not all gamma rays are scattered forward and escape from the crystals. A relatively small portion of the incident flux is scattered at an angle $180° - \varphi$ into the crystal 16. These scattered photons may interact with the crystal 16. In such case we shall have two Compton interactions in a very rapid succession: the first produced by the incident photon in the crystal 15 and the second produced by the scattered photon in the crystal 16. We obtain therefore two coincident impulses in the outputs of the photomultipliers 21 and 22.

We have considered the fact that because of the shape of curve I of FIG. 4 the number of photons that arrived from the small sphere surrounding A and that have been scattered by the crystal 15 into the crystal 16 is relatively small, and therefore the number of coincident impulses at the outputs of the photomultipliers 21 and 22 is relatively small. If, however, we consider the effect not only of a small sphere in the medium but of the whole medium, it can be readily seen that the total number of photons that have been scattered by the crystal 15 into the crystal 16 is relatively large and, therefore, the number of double coincidences due to pulses at the photomultipliers 21 and 22 is large. We shall refer, however, now to curve 3 of FIG. 3 which shows that for an incident photon of high energy the scattered photon has very small energy if the angle of scattering is large. It is apparent that the photons that have been scattered by the crystal 15 into the crystal 16 have been deviated considerably from their original direction, i.e. the scattering angle was large. Consequently these photons have small energies and when they interact with the crystal 16 they undergo a second scattering that is characterized by the curve IV of FIG. 4. Referring now more particularly to this curve, it is seen that for incident photons of small energy the scattering is more nearly isotropic, i.e. the scattered photon may be emitted in any direction, not necessarily forward. Consequently, the scattered photon that interacts with the crystal 16 may be scattered again, but not in the forward direction and thus may escape without producing any further interaction with the crystal 17. Since a further interaction with the crystal 17 is unlikely, we shall not obtain any pulse in the photomultiplier 23. Consequently there is no occurrence of a triple coincidence, and the detector will not be responsive to the radiation emitted by the surrounding medium.

It is thus apparent that when the axis of the detector is directed towards the source S, as shown in FIG. 6, the detector will be responsive only to the radiations emitted by S, i.e. it will be irresponsive to radiations emitted by the source $S^1$ and by the surrounding medium. Thus each pulse across the output leads 36 of the coincidence circuit will correspond to a gamma ray radiated by the source S. Consequently the rate of arrival of such pulses determined by the output of the counting rate circuit 37 will represent the strength of the source S.

It is apparent that the above description relates to the radiation detector shown in FIG. 1A or to the one of FIG. 1B. The presence of tungsten in FIG. 1A makes the directional counter more selective to hard gamma rays. The selectivity to hard gamma rays may also be increased by using four or more crystals arranged along the direction $MM^1$ and using a quadruple or quintuple coincidence circuit in place of the triple coincidence circuit 35.

It is also apparent that a counter comprising only two crystals such as 15, 16 aligned along the direction $MM^1$ can be used for the directional reception of gamma rays. When such detector as shown in FIG. 1C is directed towards the radiation source as shown in FIG. 6, the gamma rays arriving from the source S will be scattered by the crystal 15 into the crystal 16 and thus produce double coincidences, the frequency of said coincidences being indicated by the meter 39. The gamma rays that arrive from the source $S^1$ will be scattered by the crystal (either crystal 15 or 16) in the forward direction, and therefore will escape from the crystal and produce only a single pulse. The influence of radiations uniformly distributed in the surrounding medium will depend upon the spectral composition of these radiations. If these radiations are soft, they produce photoelectric interaction either in the crystal 15 or in the crystal 16. We obtain thus single pulses without occurrence of coincidence and therefore the detector remains insensitive to such radiation. If the gamma rays emitted by the medium are very energetic, then the scattering is predominantly forward. The detector will be insensitive to those radiations for the same reason that it is insensitive to radiations from the source $S^1$ when the axis $MM^1$ is directed as shown in FIG. 5.

It is thus apparent that a detector such as shown in FIG. 1C responds to radiation sources such as S or $S^1$ only when its axis $MM^1$ is directed towards either of these sources. Furthermore, it has a relatively small response to the radiations emitted by the surrounding medium since it does not respond to those radiations emitted by said medium that are either very soft or very hard.

Figure 7:
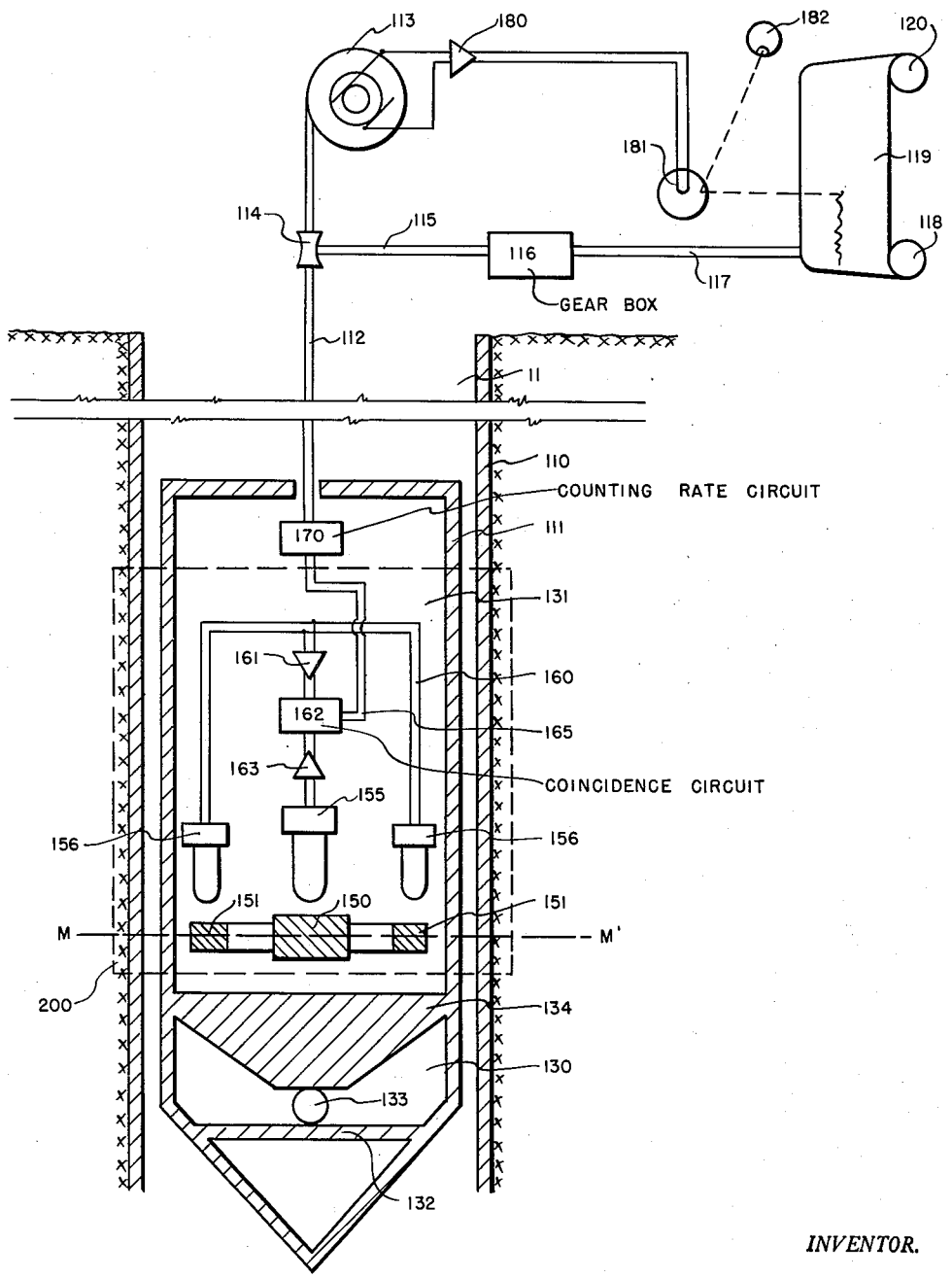
FIG. 7 illustrates diagrammatically a bore hole which penetrates the strata of the earth and the general arrangement for logging directionally the bore hole in accordance with the principles of the present invention.
Figure 9:
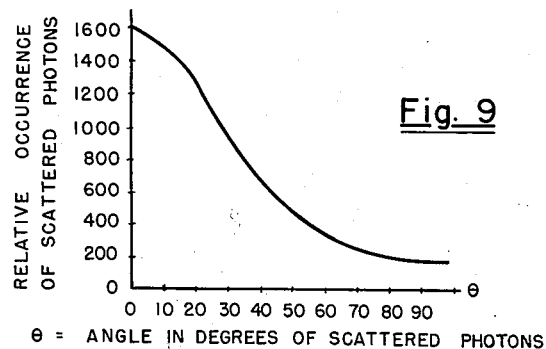
FIG. 9 illustrates graphically the relation between the rate of scattered photons and their angular deviation.
Figure 8:
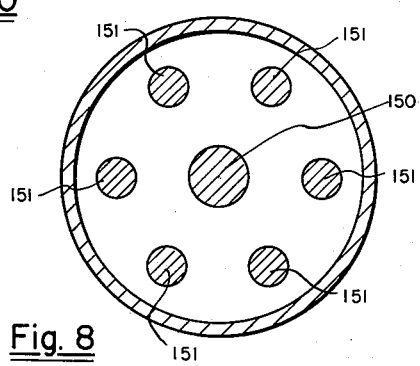
FIG. 8 shows in cross section a portion of the detecting instrument lowered in the bore hole.

The principles of directional reception embodied in FIGS. 1A, 1B, and 1C are applied to a well logging instrument shown in FIGS. 7 and 8. Referring now more particularly to FIG. 7, there is schematically illustrated a drill hole 19 penetrating the formation to be explored. The bore hole is provided in the conventional manner by a tubular metallic casing designated as 110.

For the purpose of exploring the formations along the bore hole, there is provided in accordance with the present invention exploratory apparatus comprising a housing 111 which is lowered into the bore hole 19 by means of a cable 112, preferably including as a part thereof suitable insulated conductors. The cable 112 has a length somewhat in excess of the depth of the bore hole to be explored and is normally wound on a drum 113 positioned above the bore hole opening. The cable 112 may be unwound from the drum 113 to lower the exploratory apparatus into the bore hole 19 and may be rewound upon the drum 113 to raise the exploratory apparatus.

In order to determine the depth of the exploratory apparatus within the bore hole 19 at any time, there is provided a measuring wheel 114 engaging the cable 112 above the top of the bore hole and adjusted to roll on the cable in such a manner that the number of revolutions of the reel 114 corresponds to the amount of cable which has moved past the reel in either direction. The reel 114 is mounted on a shaft 115 and rotation of the reel and consequently of the shaft 115 is transmitted through a gear box 116 to another shaft 117 which is drivingly connected to take up spool 118 for moving a photographic film 119 from a feed spool 120 to take up spool 118.

The housing 111 of the exploratory apparatus comprises two partitions designated by numerals 130 and 131, respectively. In the partition 130 there is provided a support 132 on which is disposed a suitable source of neutrons generally designated as 133 such, for example, as a radium-beryllium preparation which may be enclosed in a container made of a suitable material such as glass.

The radiations transmitted from 133 tend to propagate themselves in all directions. I have provided, however, an absorbing block 134 formed of materials, for example, such as lead and paraffin which is relatively opaque to penetrating radiations, the paraffin being relatively opaque to neutrons and the lead being relatively opaque to other radiations. I have therefore prevented a direct path between 133 and the detecting instrument positioned above the block 134. Consequently the radiations emitted from 133 are directed sideways into the adjoining formations and the amount of radiation going upwards through the absorbing block is negligible.

In the partition 131 there is provided a detector for directionally receiving the radiations from the neighboring formations. A horizontal cross section of this detector along the plane $MM^1$ is shown in FIG. 8.

The detector is of Scintillation counter type and comprises crystals in combination with photomultipliers. The crystals are adapted to convert the incoming gamma rays into impulses of light which subsequently impinge upon corresponding photomultipliers provided with suitable voltage supplies. We obtain across the output terminals of such detector current impulses which are coincident with gamma rays. More particularly, the detector shown in FIGS. 7 and 8 comprises a sodium iodide crystal 150 arranged centrally and six sodium iodide crystals 151 surrounding the crystal 150. In the immediate proximity of the crystal 150 is positioned a photomultiplier provided with a suitable voltage supply, the combined photomultiplier and the voltage supply being designated as 155. Similarly, a combined photomultiplier and voltage supply designated as 156 is positioned adjacent to each crystal 151.

The outputs of the photomultiplier 156 are connected in parallel by means of leads 160 and applied through the amplifier 161 to the input terminals of a coincidence circuit 162. Similarly, the output of the photomultiplier 155 is connected through the amplifier 163 to the other input terminals of the coincidence circuit 162. The circuit 162 is adapted to produce across its output terminals 165 a current impulse whenever impulses applied to the input terminals arrive in coincidence. The output terminals of the coincidence circuit are connected to a counting rate circuit 170 which in turn is connected to the cable 112. The counting rate circuit is of a standard construction and adapted to produce across its output terminals a voltage representing the frequency of the impulses derived from the coincidence network.

The output of the frequency counting rate circuit 170 is transmitted through insulated conductors associated with the cable 112 to the top of the drill hole. This output is subsequently amplified in amplifier 180 located above the opening to the bore hole and is connected to the galvanometer coil 181. The galvanometer coil has attached thereto a suitable mirror in a manner well known to those skilled in the art and is adapted to reflect a beam of light derived from a source 182, thereby effectively producing on the sensitive film 119 a record comprising a trace representing the variations of the current applied to the coil 181.

It is well known that the gamma rays intercepted by the peripheral crystals 151 usually undergo the process of Compton scattering in which a portion of the energy of the incoming photon is absorbed in the crystal in form of a recoil electron and another portion is scattered in form of an outgoing photon. Let $\theta$ designate the angle of scattering, i.e. the angle between the ingoing photon and the outgoing scattered photon. It is well known that Compton scattering is not isotropic. Small scattering angles are more probable than the large ones, i.e. most photons are scattered in the forward direction. This situation is illustrated in FIG. 4 in which the abscissas represent the angle of scattering in degrees of various photons undergoing Compton collisions and the ordinates represent the relative occurrence of said photons (measured in numbers per minute). It is apparent from this figure that if $\theta=0$, i.e. if the scattering photon follows the direction of the primary photon, the number of scattered photons is about 1500, i.e. is three times larger than the number of photons scattered at $\theta=45°$.

It is apparent that the peripheral crystals 151 are adapted for the reception of the incoming photons and in order to accomplish the objects of this invention we should utilize the central crystal 150 only for the reception of the scattered photons resulting from the Compton effect in the crystal 151. However, the central crystal 150 is also exposed to direct radiations emitted by the formations and we do not desire to detect these radiations. In order to eliminate the later radiations, we provide a coincidence circuit that responds only when the crystals 150 and 151 are simultaneously actuated.

Whenever an impulse appears in the output of the coincidence circuit 162, a Compton scattering took place in one of the peripheral crystals 151 and the scattered photon had a radial direction in the horizontal plane MM¹. Considering the fact that zero scattering angle is the most probable, it is evident that the most probable direction of the incoming photon is the same as the direction of the scattered photon. Consequently, the most probable direction of the incoming photons is the radial direction in the horizontal plane MM¹.

Consequently, to each impulse in the output of the coincidence network corresponds a gamma ray arriving horizontally in the plane MM¹ and simultaneously actuating by means of Compton process one of the peripheral crystals 151 and the central crystal 150. Thus I have provided a detector that responds very selectively to radiation arriving radially in the horizontal plane that are characteristic of the formation immediately adjacent thereto and located at the same level as the detector.

It is apparent that the directional detector shown in FIG. 7 is of the type illustrated in FIG. 1C, i.e. it comprises two crystal detectors 150 and 151 and an arrangement for selecting those occurrences at which the output pulses obtained from said detectors arrive at coincidence.

Figure 10:
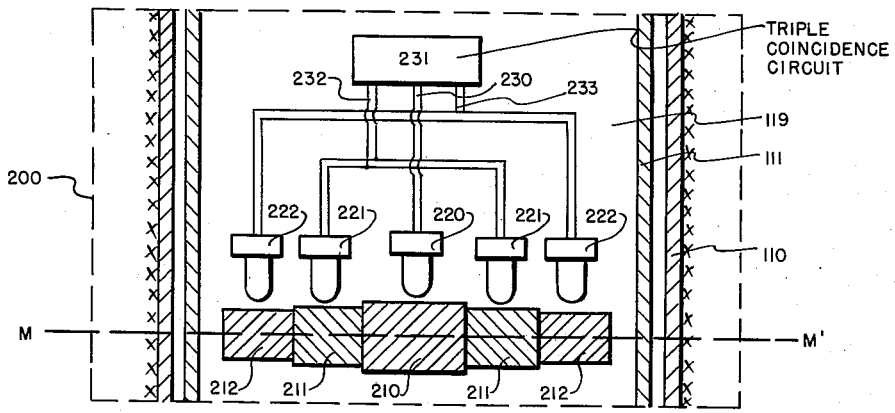
FIG. 10 shows a modified fragment of the arrangement of FIG. 7 utilizing a detector based on triple coincidence counts.
Figure 11:
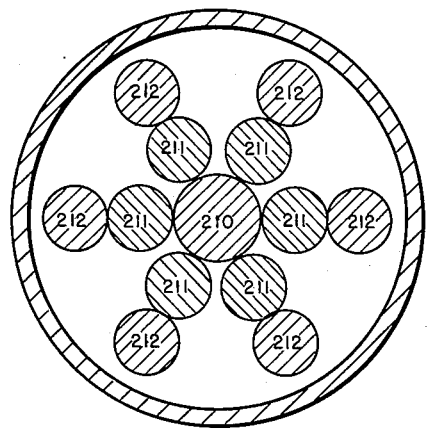
FIG. 11 shows the horizontal cross section of crystals comprised in the detector of FIG. 10.

FIGS. 10 and 11 show a modified fragment of the arrangement of FIG. 7 in which a directional counter of the type shown in FIG. 1A is used. Referring now more particularly to FIGS. 10 and 11, the modified fragment included within the dotted rectangle 200 comprises a sodium iodide crystal 210 arranged centrally, six sodium iodide crystals 211 surrounding the crystal 210 and six sodium iodide crystals 212 surrounding the crystals 211 and 210. A photomultiplier 220 is positioned adjacently to the crystal 210 and groups of photomultipliers 221 and 222 are positioned adjacent to the crystals 211 and 212. The output of the photomultiplier 220 is connected to the input channels 230 of a triple coincidence network 231. The outputs of each of the photomultipliers 221 is connected to the input channel 232 of the circuit 231 and the outputs of each of the photomultipliers 222 are connected to the input channel 233 of the coincidence network 231. The operation of this arrangement is based on the same principles as the operation of the directional detector of FIG. 1A. It is apparent that any triple coincidence count recorded by the circuit 231 is caused by an incident gamma ray arriving at a horizontal direction within the plane MM¹. Thus I have provided a detector that responds very selectively to radiations arriving radially in the horizontal plane that are characteristic of the formation immediately adjacent thereto and located at the same level as the detector.

It is thus apparent that I have provided a nuclear well logging system by means of which we obtain indication representing the particular formation located at the level of the detector, said indication being free from any extraneous effects caused by formations located above and below said particular formation.

It will be obvious to those skilled in the art that numerous modifications other than those herein disclosed can be made without departing from the scope or spirit of this invention.

I claim:

1. In an apparatus for measuring gamma radiation emitted by various formations surrounding a bore hole, a housing adapted to be lowered into said bore hole and having its axis parallel to said hole, said housing comprising two gamma ray counters, said counters operative to produce electric pulses responsively to interaction of gamma rays therewith being oriented in a plane perpendicular to said axis, a coincidence circuit having its two input channels respectively connected to said two counters, shielding means operative to bar charged particles originating in said formations from gaining access to the counters, means for determining the depth at which said housing is lowered, means for measuring the rate of occurrence of output pulses from said coincidence circuit and means for recording said rate of occurrence in correlation with depth.

2. In an apparatus for radiological logging of bore holes, a housing adapted to be lowered into a bore hole and having its axis parallel to the axis of said hole, said housing comprising a source of neutrons arranged to radiate neutrons into the formations surrounding said hole, whereby gamma rays are emitted as a result of interaction of said neutrons with said formations, two gamma ray counters operative to produce electric pulses responsively to interaction of gamma rays therewith, said counters being oriented in a plane perpendicular to said axis, a coincidence circuit having two input channels, respectively connected to said two counters, shielding means operative to bar charged particles originating in said formations from gaining access to the counters, means for measuring the rate of occurrence of output pulses from said coincidence circuit, means for determining the depth at which said housing is lowered, and means for recording said occurrence rate in correlation with depth.

3. A method of determining the nature of formations surrounding a bore hole, said formations emitting gamma rays, which comprises the steps of lowering to various depths in the bore hole a gamma-ray detecting element, thereby causing gamma radiation from said formations to intercept said element, selecting those radiations that are scattered by said element in a determined direction, and measuring the rate of occurrence of said selected radiations for various depths within the hole.

4. A method of determining the nature of formations surrounding a bore hole, comprising the steps of lowering to various depths in the bore hole a gamma-ray detecting element, successively bombarding the formations at such various depths with penetrative radiation, causing gamma radiation from said formation resulting from interaction of such formations with said penetrating radiation to enter said bore hole and to intercept said element, selecting those gamma radiations that are scattered by said element in a determined direction, and measuring the rate of occurrence of said selected radiations for each of such various depths.

5. A method of determining the nature of formations surrounding a bore hole, said formations emitting gamma rays, which comprises the steps of lowering to various depths in the bore hole a gamma-ray detecting element, thereby causing gamma radiation from said formations to intercept said element, selecting those radiations that are scattered by said element in a determined direction, measuring such depths, and measuring the rate of occurrence of such selected radiations in correlation with depth.

6. In an apparatus for measuring gamma radiation emitted by formations surrounding a bore hole, a housing adapted to be lowered into said bore hole and having its axis parallel to said hole, said housing comprising two gamma-ray detectors operative to produce electric pulses responsively to interaction of gamma rays therewith, said detectors being oriented in a definite direction with respect to said axis, a coincidence network having two input channels respectively fed by said detectors, shielding means operative to bar charged particles originating in said formations from gaining access to said detectors, means for measuring the rate of occurrence of output pulses from said coincidence network, means for determining the depth to which said housing is lowered, and means for recording said occurrence rate in correlation with depth.

7. In an apparatus for radiological logging of bore holes, a housing adapted to be lowered into a bore hole and having its axis parallel to the axis of said hole, a source carried by said housing comprising atoms undergoing nuclear disintegrations, thereby emitting radiations resulting from such disintegrations, two gamma-ray detectors within said housing operative to produce electric pulses responsively to interaction of gamma rays therewith, said detectors being oriented in a definite direction with respect to the axis of said housing, a coincidence network having two input channels respectively fed by said two detectors, first shield means shielding said detectors from direct radiation emanating from said source, other shielding means operative to bar charged particles originating in said formations from gaining access to said detectors, means for measuring the rate of occurrence of output pulses from said coincidence network, means for determining the depth to which said housing is lowered, and means for recording said occurrence rate in correlation with depth.

8. In an apparatus for measuring gamma radiation emitted by formations surrounding a bore hole, an elongated housing adapted to be lowered into said bore hole, said housing comprising at least three gamma-ray detectors disposed substantially in a straight line, said line being disposed in a definite predetermined direction relative to the axis of said housing, said detectors being of the type which produce electric impulses responsively to interaction of gamma rays therewith, a multiple-coincidence network having an input channel for each of said detectors, said input channels being respectively fed by said detectors, shielding means operative to bar charged particles originating in formations outside said bore hole from gaining access to said detectors, means for measuring the rate of occurrence of output pulses from said coincidence network, means for determining the depth to which said housing is lowered, and means for recording said occurrence rate in correlation with depth.

9. The combination defined in claim 8 wherein said line defining the orientation of said detectors is at right angles to the axis of said housing.

References Cited in the file of this patent
UNITED STATES PATENTS

| | | |
|---|---|---|
| 2,316,361 | Piety | Apr. 13, 1943 |
| 2,349,753 | Pontecorvo | May 23, 1944 |
| 2,383,478 | Friedman et al. | Aug. 28, 1945 |
| 2,443,731 | Herzog et al. | June 22, 1948 |
| 2,513,805 | Kanne | July 4, 1950 |
| 2,711,482 | Goodman | June 21, 1955 |
| 2,725,486 | Walstrom | Nov. 29, 1955 |

OTHER REFERENCES

"Cosmic Rays," Janossy, published by the Oxford Press, London, England, 1948, pp. 154–155.

"Geiger Counter Tubes," Friedman, proceedings of the I.R.E., July 1949, vol. 37, #7, page 807.

Hofstradter et al.: "Measurement of Gamma-Ray Energies With Two Crystals in Coincidence" (April–June 1950) Physical Review, V78, pages 619–620.

Hofstradter et al.: "Gamma-Ray Measurement With NaI (TL) Crystals" (July–September 1950) Physical Review V79, pages 389–391.

"Instrumentation for Radioactivity," Pieper Science, vol. 12, Oct. 6, 1950, pp. 377–380.

UNITED STATES PATENT OFFICE
CERTIFICATION OF CORRECTION

Patent No. 2,990,474                                      June 27, 1961

Serge A. Scherbatskoy

It is hereby certified that error appears in the above numbered patent requiring correction and that the said Letters Patent should read as corrected below.

Column 9, line 66, strike out ", said counters" and insert the same after "therewith" in line 68, same column 9.

Signed and sealed this 3rd day of April 1962.

(SEAL)
Attest:

ERNEST W. SWIDER                                    DAVID L. LADD
Attesting Officer                                        Commissioner of Patents